US009215107B1

(12) United States Patent
De Bernardinis (10) Patent No.: US 9,215,107 B1
(45) Date of Patent: Dec. 15, 2015

(54) DUAL LOOP CLOCK AND DATA RECOVERY

(71) Applicant: Marvell International Ltd., Hamilton HM 12 (BM)

(72) Inventor: Fernando De Bernardinis, Pavia (IT)

(73) Assignee: MARVELL INTERNATIONAL LTD., Hamilton (BM)

( * ) Notice: Subject to any disclaimer, the term of this patent is extended or adjusted under 35 U.S.C. 154(b) by 0 days.

(21) Appl. No.: 14/289,577

(22) Filed: May 28, 2014

Related U.S. Application Data

(60) Provisional application No. 61/828,462, filed on May 29, 2013.

(51) Int. Cl.
*H04L 25/00* (2006.01)
*H04L 25/03* (2006.01)

(52) U.S. Cl.
CPC .............................. *H04L 25/03057* (2013.01)

(58) Field of Classification Search
CPC ... H04L 7/00; H04L 7/0033; H04L 25/03159; H04L 27/00; H04L 27/01; H04L 27/06; H04B 1/10; H04B 1/38; H04B 10/06; H04B 15/00
USPC .......... 370/201, 286, 291, 301; 375/219, 232, 375/233, 316, 321, 345, 350, 355, 359, 375/362; 455/63.1, 296, 307
See application file for complete search history.

(56) References Cited

U.S. PATENT DOCUMENTS

| | | | | |
|---|---|---|---|---|
| 2005/0185742 | A1* | 8/2005 | Liu | 375/348 |
| 2008/0063041 | A1* | 3/2008 | Galperin et al. | 375/233 |
| 2010/0098147 | A1* | 4/2010 | Miller | 375/233 |
| 2011/0052216 | A1* | 3/2011 | Jiang et al. | 398/208 |
| 2014/0241478 | A1* | 8/2014 | Malipatil et al. | 375/362 |

* cited by examiner

*Primary Examiner* — Sam K Ahn
*Assistant Examiner* — Shawkat M Ali (57) ABSTRACT

A clock and data recovery (CDR) apparatus includes an analog to digital converter configured to sample an input signal according to a sampling clock and provide a digitized signal, a first loop circuit configured to provide a first equalized signal corresponding to the digitized signal, and a slicer configured to provide a data signal based on the first equalized signal. A second loop circuit is configured to provide a second equalized signal corresponding to the digitized signal and adjust the sampling clock according to the second equalized signal. A CDR method includes converting an analog signal into a digitized signal using a sampling clock, providing a first equalized signal using the digitized signal, providing a second equalized signal using the digitized signal, determining the sampling clock using the second equalized signal, and generating a data signal using the first equalized signal.

19 Claims, 8 Drawing Sheets

DUAL LOOP CLOCK AND DATA RECOVERY

CROSS REFERENCE TO RELATED APPLICATIONS

This present disclosure claims the benefit of U.S. Provisional Application No. 61/828,462, filed on May 29, 2013, which is incorporated by reference herein in its entirety.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

In a high speed serial communication link, such as the lanes of a 10 Gigabit (10 G) or 100 Gigabit (100 G) Ethernet connection, a transmitter transmits a data signal into a communication channel (channel) without an accompanying clock signal. The data signal includes a sequence of symbols, each symbol carrying information from some number of bits, such as one, two, or more bits, or in some cases fractions of bits.

The symbols are transmitted at a modulation rate expressed in baud, where one baud is one symbol per second. The duration of each symbol is known as the Unit Interval (UI).

In order to receive the data on the communication link, a receiver determines a phase and a frequency of a clock used to sample a signal received from the channel. The process of determining the phase and frequency of the clock is part of a Clock and Data Recovery (CDR) process.

The receiver may have a baud-rate architecture, meaning that the receiver only samples the signal from the channel once per UI. In a baud-rate architecture, the CDR circuit of the receiver may seek to adjust the phase and frequency of the clock so that sampling occurs in the middle of an appropriate UI for each symbol in order to maximize the Signal-to-Noise Ratio (SNR).

Because the channel coupling the transmitter to the receiver is not perfect, dispersion and reflections occur in the channel. As a result, one or more portions of the energy from a transmitted symbol may arrive at the receiver at different times.

At high symbol rates, where the range of arrival times for the energy from one symbol is greater than the UI, energy from a plurality of sequentially transmitted symbols may arrive at the receiver simultaneously. The energy from each symbol contributes to the signal value seen at the receiver, a phenomena called Inter-Symbol Interference (ISI).

ISI makes CDR more difficult, and also lowers the SNR which may lead to bit errors.

SUMMARY

In an embodiment, an apparatus includes an analog to digital converter (ADC) configured to sample an input signal according to a sampling clock and provide a digitized signal, a first loop circuit configured to provide a first equalized signal corresponding to the digitized signal, a slicer configured to provide a data signal based on the first equalized signal, and a second loop circuit configured to provide a second equalized signal corresponding to the digitized signal and adjust the sampling clock according to the second equalized signal.

In an embodiment, the input signal includes a plurality of symbols transmitted at a baud rate, and the ADC is configured to sample the input signal at a rate substantially equal to the baud rate to produce the digitized signal.

In an embodiment, the first loop circuit includes a Feed Forward Equalizer (FFE) configured to receive the digitized signal and a Decision Feedback Equalizer (DFE) configured to receive the data signal. The first loop circuit is configured to produce the first equalized signal using output signals of the FFE and the DFE.

In an embodiment, the second loop circuit includes a Feed Forward Equalizer (FFE) configured to receive the digitized signal and a Timing Error Detector configured to control a phase of the sampling clock according to an output signal of the FFE.

In an embodiment, the first loop circuit includes a Decision Feedback Equalizer (DFE) configured to receive the data signal, and the second loop circuit includes a Feed Forward Equalizer (FFE) configured to receive the digitized signal, and a leak circuit configured to receive an output of the DFE of the first loop circuit and scale the output of the DFE by a leak coefficient, the leak coefficient being less than one. The second loop circuit is configured to generate the second equalized signal using output signals of the leak circuit and the FFE.

In an embodiment, the second loop circuit includes a fractional delay circuit configured to receive the digitized signal and a Feed Forward Equalizer (FFE) configured to receive an output signal of the fractional delay circuit.

In an embodiment, the first loop circuit includes a first Feed Forward Equalizer (FFE), the second loop circuit includes a second FFE, and the second FFE uses the same coefficients as the first FFE.

In an embodiment of a method of performing clock and data recovery in a receiver, the method includes converting an analog signal into a digitized signal using a sampling clock, providing a first equalized signal using the digitized signal, providing a second equalized signal using the digitized signal, determining the sampling clock using the second equalized signal, and generating a data signal using the first equalized signal.

In an embodiment, the first equalized signal is provided by a first loop circuit, and the second equalized signal is provided by a second loop circuit that is different than the first loop circuit.

DETAILED DESCRIPTION

Figure 1:
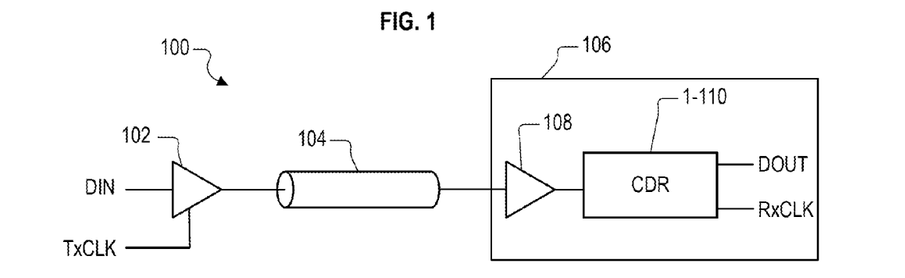
FIG. 1 illustrates a communication link according to an embodiment of the disclosure.

FIG. 1 shows a communication link 100 according to an embodiment. The communications link includes a transmitter 102, a channel 104, and a receiver 106. The receiver includes an Analog Front End (AFE) 108 and a Clock and Data Recovery (CDR) circuit 1-110. In an embodiment, the CDR circuit 1-110 is included in an integrated circuit.

The transmitter 102 receives input data DIN and a transmit clock TxCLK. The transmitter 102 generates symbols based on the input data DIN and transmits the symbols into the channel 104 at a rate determined by the transmit clock TxCLK, each symbol being transmitted in a Unit Interval (UI) equal to the inverse of a frequency of the transmit clock TxCLK.

The channel 104 propagates the symbols from the transmitter 102 to the receiver 106. As the symbols are propagated, properties of the channel 104 cause modification of the symbols. In particular, dispersions and reflections in the channel 104 may change the propagation time of portions of energy used to transmit the symbol, such that a portion of the energy used to transmit a first symbol may arrive at the receiver 106 during more than one UI, and in particular may arrive at the receiver 106 simultaneously with energy used to transmit a previously-transmitted or subsequently-transmitted second symbol. The simultaneous reception of energy from two symbols transmitted at different times causes Inter-Symbol Interference (ISI).

For any received symbol, the UI centered near the interval when the maximum energy arrives from the symbol is termed the cursor. UIs that occur after the cursor are termed postcursor, and energy from the symbol that arrives postcursor, that is, that takes longer to propagate through the channel 104 than the majority of the symbol's energy, creates postcursor ISI. UIs that occur before the cursor are termed precursor, and energy from the symbol that arrives precursor, that is, that takes less time to propagate through the channel 104 than the majority of the symbol's energy, creates precursor ISI.

The AFE 108 receives the energy from the channel 104 and produces an output signal. The AFE 108 may include circuits that isolate, impedance match, equalize, and amplify the energy received from the channel 104.

The CDR circuit 1-110 receives the AFE output signal from the AFE 108, determines a frequency and phase of a receive clock RxCLK from the output signal from the AFE 108, and recovers received data DOUT from the output signal from the AFE 108 using the receive clock RxCLK. The CDR circuit 1-110 then outputs the received data DOUT. In an embodiment, the CDR circuit 1-110 may also output the receive clock RxCLK for use by other circuits.

Figure 2:
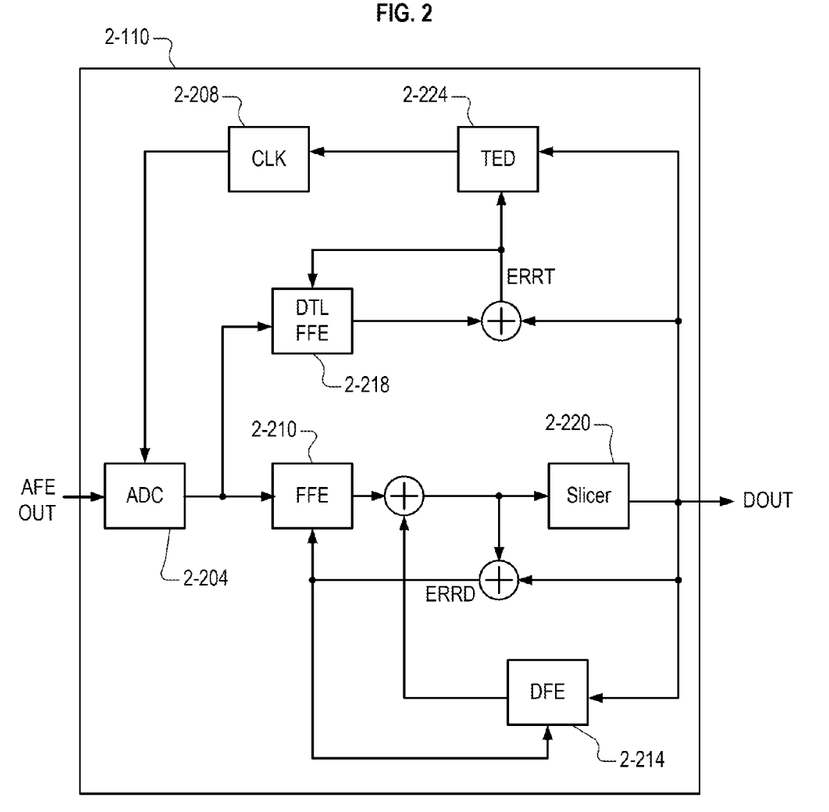
FIG. 2 is a block diagram of a Clock and Data Recovery (CDR) circuit according to an embodiment.

FIG. 2 is a block diagram of a CDR circuit 2-110 suitable for use as the CDR circuit 1-110 of FIG. 1 according to an embodiment. The CDR circuit 2-110 includes an Analog to Digital Converter (ADC) 2-204, a clock generator 2-208, a Feed-Forward Equalizer (FFE) 2-210, a Decision Feedback Equalizer (DFE) 2-214, a Delay Timing Loop (DTL) FFE 2-218, a slicer 2-220, and a Timing Error Detector (TED) 2-224.

The ADC 2-204 receives the AFE output signal AFE OUT as an input signal and converts it to a digitized signal. In the embodiment shown in FIG. 2, the ADC 2-204 operates at the baud rate; that is, the ADC 2-204 performs one analog to digital conversion per UI; however, embodiments are not limited thereto. The rate and timing of the analog to digital conversions performed by the ADC 2-204 is determined by a sampling clock received from the clock generator 2-208.

The ADC 2-204 may be implemented using one or more of a flash ADC, pipelined ADC, successive approximation ADC, integrating ADC, and the like. The ADC 2-204 may also be implemented using a plurality of time-interleaved ADCs. In an embodiment, the digitized signal produced by the ADC 2-204 includes a plurality of bits for each symbol of the input signal.

The clock generator 2-208 generates a sampling clock with a phase and frequency determined according to clock control signals received from the TED 2-224. The clock generator 2-208 may be implemented using one or more of a Digitally Controlled Oscillator (DCO), Delay-Locked Loop (DLL), Voltage Controlled Oscillator (VCO), phase interpolator, and the like.

The FFE 2-210, DFE 2-214, and DTL FFE 2-218 are each configured to perform a convolution on respective sequences of input signals using respective sets of coefficients. The coefficients may be determined to compensate for the ISI caused by the channel. The FFE 2-210, DFE 2-214, and DTL FFE 2-218 may each include a pipelined convolution circuit and/or a plurality of time-interleaved convolution circuits.

The FFE 2-210 is configured to multiply each of a sequence of the digitized signal by a corresponding coefficient of a plurality of FFE coefficients, and then sum the results of the multiplications to produce an FFE output value during each UI. The sequence of the digitized signal includes a value currently being equalized, that is, the cursor value, and a coefficient of the FFE coefficients corresponding to the cursor value may be equal to unity. The sequence of the digitized signal further includes values from UIs preceding in time the cursor UI, that is, precursor values, and values from UIs following in time the cursor UI, that is, postcursor values. The FFE coefficients may include coefficients corresponding to some or all of the precursor and postcursor values.

The DFE 2-214 is configured to multiply each of a sequence of values produced by the slicer 2-220 by a corresponding coefficient of a plurality of DFE coefficients, and then sum the results of the multiplications to produce a DFE output value during each UI. The DFE coefficients may include coefficients corresponding to precursor UIs.

The DFE output value is then combined with the FFE output value to produce the input signal for the slicer 2-220. The slicer 2-220 decides the value of the symbol, for example, by comparing the input signal of the slicer 2-220 to one or more thresholds, and produces the received data DOUT. In addition, the input signal to the slicer 2-220 is combined with a corresponding received data DOUT to produce a data error signal ERRD.

The FFE and DFE coefficients are adapted to the characteristics of the channel using the data error signal ERRD. In an embodiment, a Least-Mean-Square (LMS) loop is used to adapt the FFE and DFE coefficients.

In an embodiment, determining the FFE and DFE coefficients may include adapting the coefficients using a training sequence. A person of skill in the art in light of the teachings and disclosure herein would understand how to determine the FFE and DFE coefficients.

The DTL FFE 2-218 is configured to multiply each of the sequence of values of the digitized signal by a corresponding coefficient of a plurality of DTL FFE coefficients, and then sum the results of the multiplications to produce a DTL FFE output value for each UI. The DTL FFE coefficients may include coefficients corresponding to the cursor, precursor, and postcursor UIs. The DTL FFE output value is combined with the received data DOUT produced by the slicer 2-220 to produce a timing error signal ERRT.

The DTL FFE coefficients are adapted to the characteristics of the channel using the timing error signal ERRT. In an embodiment, a Least-Mean-Square (LMS) loop is used to adapt the DTL FFE coefficients.

In an embodiment, the DTL FFE coefficient corresponding to the cursor UI, i.e. the cursor coefficient, is fixed at unity. In an embodiment, the DTL FFE postcursor and precursor coefficients are both adapted during a first interval, and then a subset of the DTL FFE coefficients are frozen (for example, the first precursor coefficient may be frozen), and only the remaining (i.e. unfrozen) DTL FFE coefficients are adapted during a second interval. A person of skill in the art in light of the teachings and disclosure herein would understand how to adapt the DTL FFE coefficients to the characteristics of the channel.

In an embodiment, the DTL FFE 2-218 operates at a different precision, that is, using a different number of bits to express values for the digitized signal, the coefficients, or both, than the FFE 2-210 and/or DFE 2-214. In an embodiment, the precision of the DTL FFE 2-218 is lower than the precision of the FFE 2-210 and/or DFE 2-214.

In an embodiment, the amount of parallelism, that is, the number of simultaneous operations being performed at any one time, in the DTL FFE 2-218 is lower than the amount of parallelism in the FFE 2-210.

The TED 2-224 determines a timing error using the received data DOUT and the timing error signal ERRT. In an embodiment, the TED 2-224 determines a postcursor impulse response and a precursor impulse response using the received data DOUT and the timing error signal ERRT, and generates a clock control signal to the clock circuit 2-208 to alter the phase and/or frequency of the clock so as to make the postcursor impulse response and precursor impulse response substantially equal.

Thus, the FFE 2-210 and DFE 2-214 are components of a first loop used to produce the received data DOUT. The DTL FFE 2-218, TED 2-224, and clock circuit 2-208 are components of a second loop used to adjust the phase and frequency of the sampling clock used by the ADC 2-204.

The use of the first and second loop reduces interaction between the TED 2-224 of the second loop and the FFE 2-210 and DFE 2-214 of the first loop, and therefore reduces the likelihood of detrimental effects that can arise from such interaction, such as erratic sequences of the coefficients of the convolutions or complete instability. In addition, some parameters of the second loop, such as the precursor coefficients of the DTL FFE 2-218, can be frozen to avoid erratic behavior while still allowing the FFE 2-210 to maintain full adaptivity without freezing the timing loop.

In an embodiment, the first loop is configured to optimize the Signal-to-Noise Ratio (SNR) of the input signal to the slicer, and the second loop is configured to substantially equalize the postcursor and precursor impulse responses.

Figure 3:
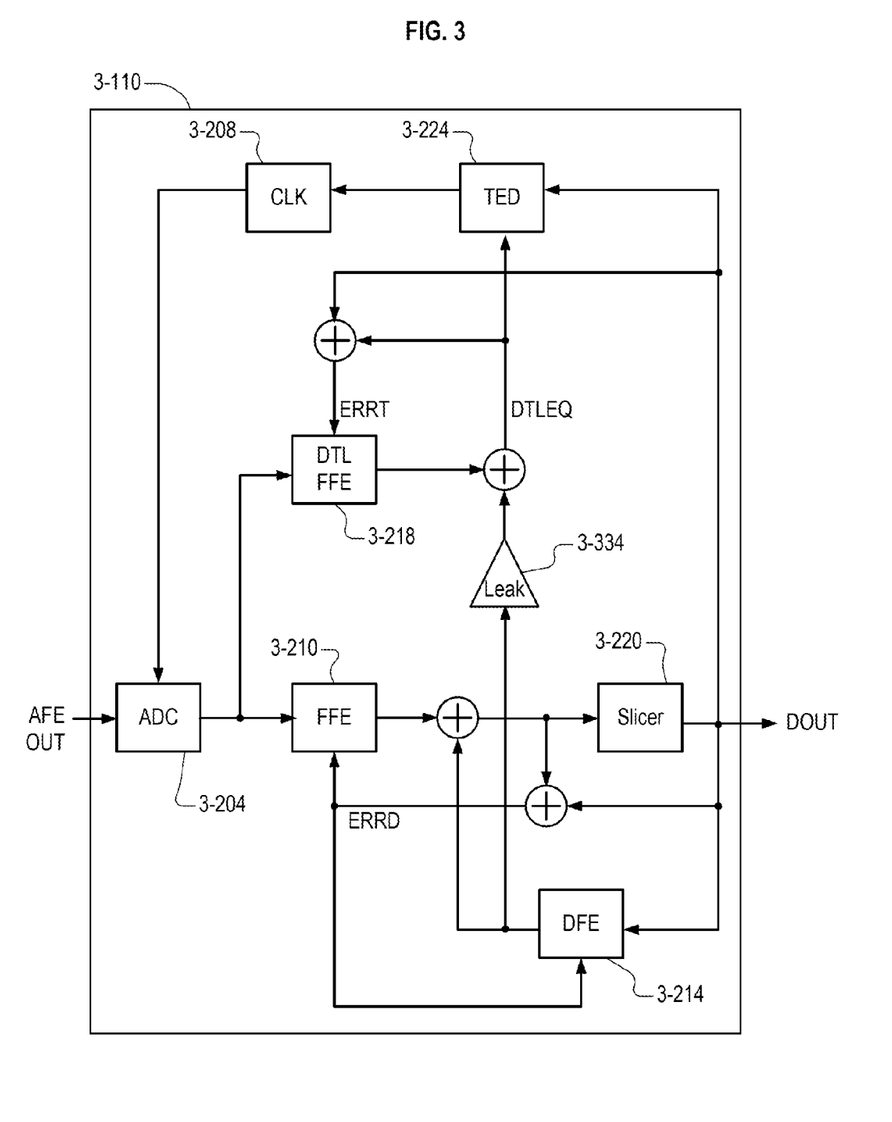
FIG. 3 is a block diagram of a CDR circuit according to another embodiment.

FIG. 3 is a block diagram of a CDR circuit 3-110 suitable for use as the CDR circuit 1-110 of FIG. 1 according to another embodiment. The CDR circuit 2-110 includes an Analog to Digital Converter (ADC) 3-204, a clock generator 3-208, a Feed-Forward Equalizer (FFE) 3-210, a Decision Feedback Equalizer (DFE) 3-214, a Delay Timing Loop (DTL) FFE 3-218, a slicer 3-220, and a Timing Error Detector (TED) 3-224. The CDR circuit 3-110 further includes a leak value circuit 3-334.

The FFE 3-210 and DFE 3-214 are components of a first loop used to produce the received data DOUT. The first loop, ADC 3-204, and slicer 3-220 of the embodiment shown in FIG. 3 operates similarly to the corresponding components of the embodiment shown in FIG. 2, and therefore will not be described in detail.

The DTL FFE 3-218, TED 3-224, and clock circuit 3-208 are components of a second loop used to determine the phase and frequency of the sampling clock used by the ADC 3-204. The second loop of FIG. 3 differs from the second loop of FIG. 2 by combining a portion of the output of the DFE 3-214 with the output of the DTL FFE 3-218.

Specifically, the DTL FFE 3-218 of FIG. 3 operates similarly to the DTL FFE 2-218 of FIG. 2. The output of the DFE 3-214 is scaled by the leak value circuit 3-334 by a leak coefficient to produce a scaled DFE value. The leak coefficient is a positive value less than one, and in an embodiment may be a value between 0.5 and 0.75, but embodiments are not limited thereto. The scaled DFE value is combined with the output of the DTL FFE 3-218 to produce a DTL equalized value DTLEQ. The scaled DFE value may partially cancel postcursor ISI caused by previous symbols.

The DTL equalized value DTLEQ is combined with the received data DOUT to produce a timing error signal ERRT. The timing error signal ERRT is used to adapt the coefficients of the DTL FFE 3-218 to the characteristics of the channel, similarly as described for the DTL FFE 2-218 of FIG. 2. In an embodiment, an LMS loop is used to adapt the coefficients of the DTL FFE 3-218.

The DTL equalized value DTLEQ and the received data DOUT are received by the TED 3-224. The TED 3-224 uses the DTL equalized value DTLEQ and the received data DOUT to control the phase and frequency of a sampling clock generated by the clock circuit 3-208, in a manner similar to the TED 2-224 of the embodiment shown in FIG. 2.

In an embodiment of the CDR circuit 3-110, a plurality of filters are implemented using the DTL FFE 3-218, each filter corresponding to a different channel profile. In an embodiment, the channel profiles include Long Reach Multimode (LRM) channel profiles for use in multimode fiber optic links, such as those defined in the IEEE 802.3aq 10 GBASE-LRM 10 Gbit/s Ethernet standard.

Figure 4:
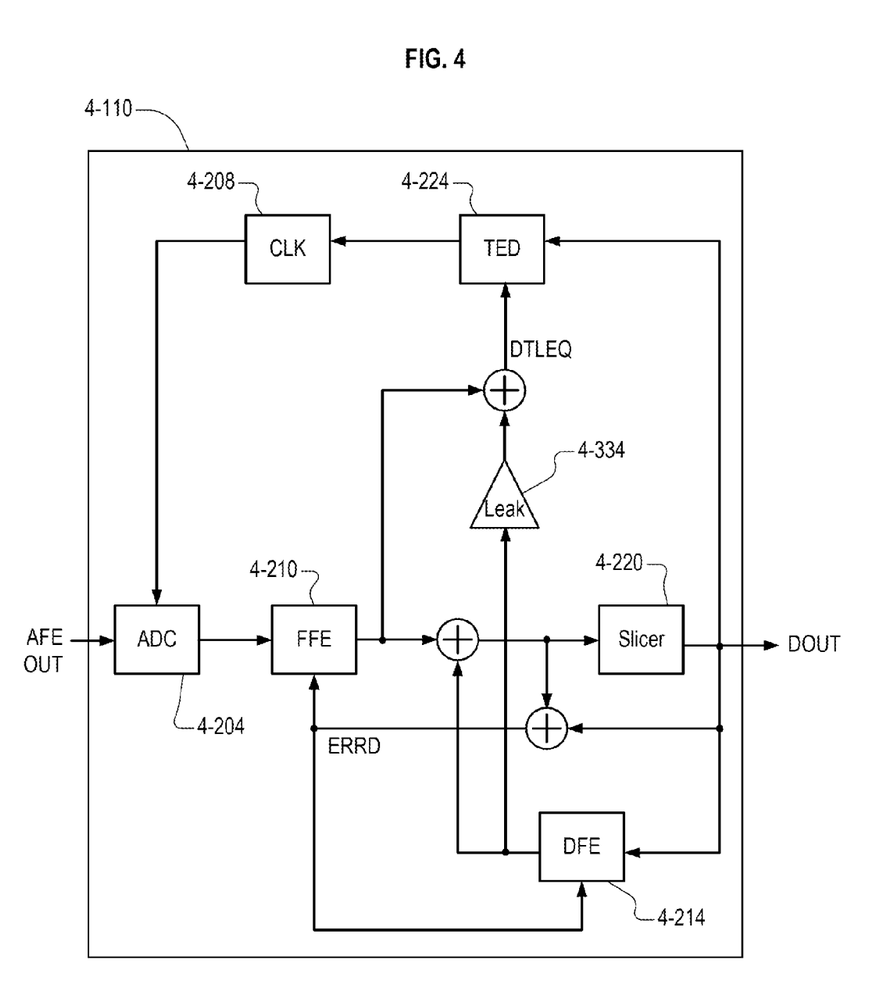
FIG. 4 is a block diagram of a CDR circuit according to another embodiment.

FIG. 4 is a block diagram of a CDR circuit 4-110 suitable for use as the CDR circuit 1-110 of FIG. 1 according to another embodiment. The CDR circuit 4-110 includes an Analog to Digital Converter (ADC) 4-204, a clock generator 4-208, a Feed-Forward Equalizer (FFE) 4-210, a Decision Feedback Equalizer (DFE) 4-214, a slicer 4-220, and a Timing Error Detector (TED) 4-224. The CDR circuit 4-110 further includes a leak value circuit 4-334.

The FFE 4-210 and DFE 4-224 are components of a first loop used to produce the received data DOUT. The first loop, ADC 4-204, and slicer 4-220 of the embodiment shown in FIG. 4 operates similarly to the corresponding components of the embodiment shown in FIG. 2, and therefore will not be described in detail.

The TED 4-224, and clock circuit 4-208 are components of a second loop used to determine the phase and frequency of the sampling clock used by the ADC 4-204. The second loop of FIG. 4 combines a portion of the output of the DFE 4-214 with the output of the FFE 4-210.

Specifically, the output of the DFE 4-214 is scaled by the leak value circuit 4-334 by a leak coefficient to produce a scaled DFE value. The leak coefficient is less than one, and in an embodiment may be a value between 0.1 and 0.25, but embodiments are not limited thereto. The scaled DFE value is combined with the output of the FFE 4-210 to produce a DTL equalized value DTLEQ. The scaled DFE value may partially cancel postcursor ISI caused by previous symbols.

The DTL equalized value DTLEQ and the received data DOUT are received by the TED 4-224. The TED 4-224 uses the DTL equalized value DTLEQ and the received data DOUT to control the phase and frequency of a sampling clock generated by the clock circuit 4-208, in a manner similar to the TED 2-224 of the embodiment shown in FIG. 2.

Figure 5:
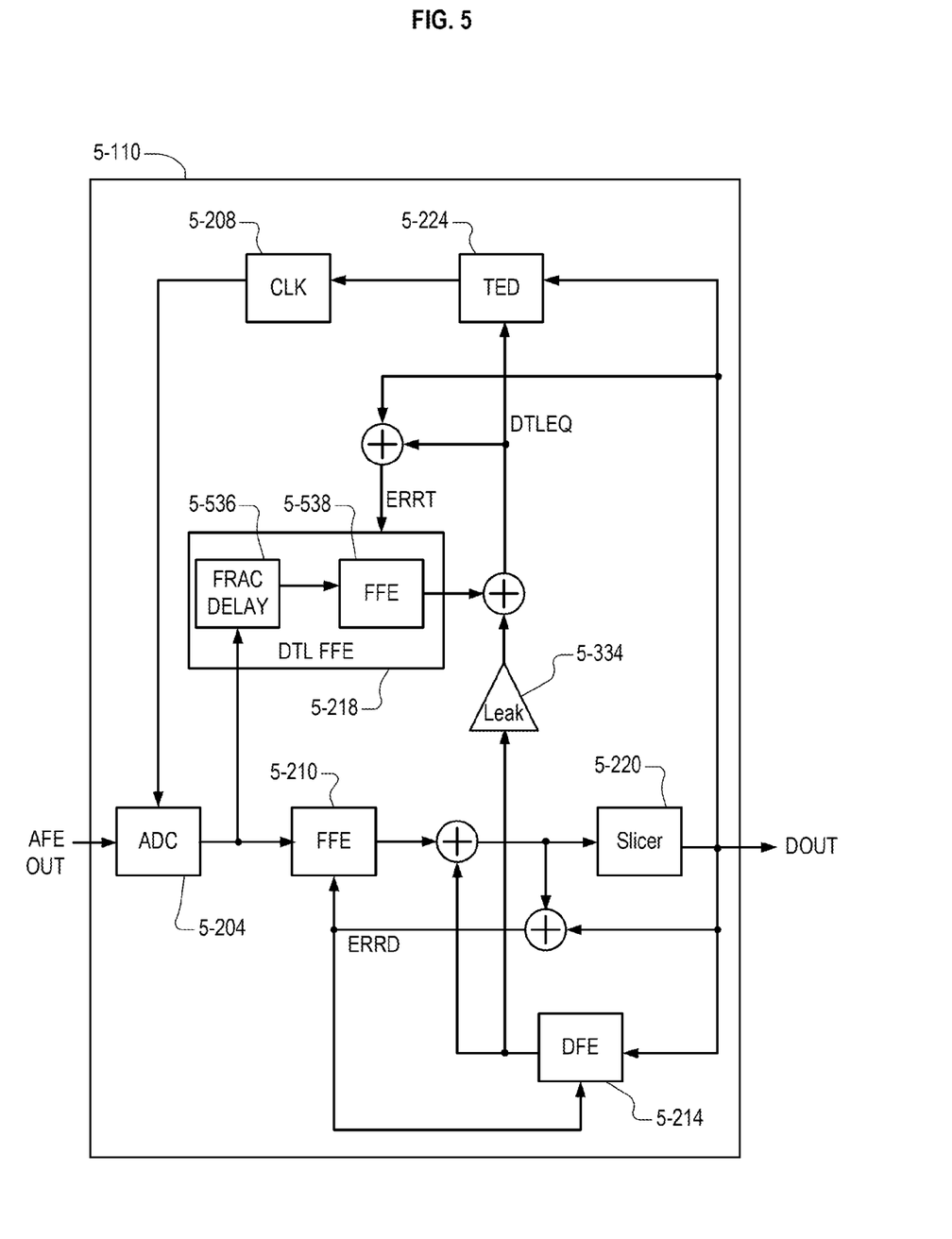
FIG. 5 is a block diagram of a CDR circuit according to another embodiment.

FIG. 5 is a block diagram of a CDR circuit 5-110 suitable for use as the CDR circuit 1-110 of FIG. 1 according to another embodiment. The CDR circuit 5-110 includes an Analog to Digital Converter (ADC) 5-204, a clock generator 5-208, a first Feed-Forward Equalizer (FFE) 5-210, a Decision Feedback Equalizer (DFE) 5-214, a slicer 5-220, a Timing Error Detector (TED) 5-224, a leak value circuit 5-334, and a Delay Timing Loop (DTL) FFE 5-218. The DTL FFE 5-218 includes a fractional delay value circuit 5-536 and a second FFE 5-538.

The first FFE 5-210 and DFE 5-214 are components of a first loop used to produce the received data DOUT. The first loop, ADC 5-204, and slicer 5-220 of the embodiment shown in FIG. 4 operates similarly to the corresponding components of the embodiment shown in FIG. 2, and therefore will not be described in detail.

The DTL FFE 5-218, TED 5-224, and clock circuit 5-208 are components of a second loop used to determine the phase and frequency of the sampling clock used by the ADC 5-204. The second loop of FIG. 5 differs from the second loop of FIG. 3 by the inclusion of fractional delay circuit 5-536 before the second FFE 5-538 of the DTL FFE 5-218.

In the DTL FFE 5-218, the FFE operation performed by the second FFE 5-538 is convolved with a fractional delay using the fractional delay circuit 5-536. Convolving the FFE operation with a fractional delay allows very fine control of the sampling time. In an embodiment, the fractional delay circuit 5-536 generates the fractional delay by interpolating between successive output values from the ADC 5-204. In an embodiment, an LMS loop is used to adapt the coefficients of the second FFE 5-583. In an embodiment, the fractional delay provided by the fractional delay circuit 5-536 is selected by determining a plurality of SNR values corresponding to a plurality of fractional delay values in a range, such as from 0 to 1 UI, and selecting a fractional delay value having a best corresponding SNR value.

The coefficients of the second FFE 5-538 are adapted to the channel in a manner similar to the adaption of the coefficients of the DTL FFE 3-218 of FIG. 5. In an embodiment, an LMS loop is used to adapt the coefficients of the second FFE 5-538.

In an embodiment of the CDR circuit 5-110, a plurality of filters can be implemented using the DTL FFE 5-218, each filter corresponding to a different channel profile. In an embodiment, the channel profiles include Long Reach Multimode (LRM) channel profiles for use in multimode fiber optic links, such as those defined in the IEEE 802.3aq 10 GBASE-LRM 10 Gbit/s Ethernet standard. In an embodiment, a filter of the plurality of filters is a low pass filter convolved with a fraction delay, and the fractional delay is selected to optimize an SNR measurement.

Figure 6:
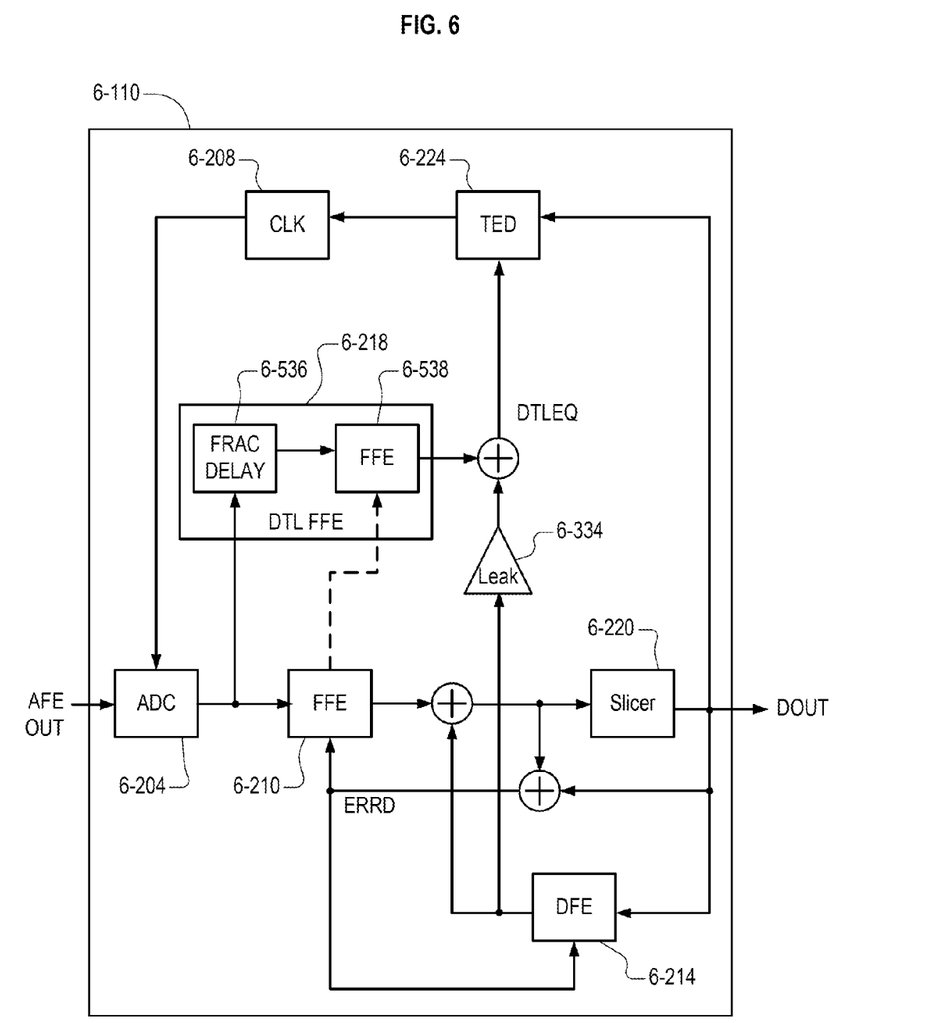
FIG. 6 is a block diagram of a CDR circuit according to another embodiment.

FIG. 6 is a block diagram of a CDR circuit 6-110 suitable for use as the CDR circuit 1-110 of FIG. 1 according to another embodiment. The CDR circuit 6-110 includes an ADC 6-204, a clock generator 6-208, a first FFE 6-210, a DFE 6-214, a slicer 6-220, a TED 6-224, a leak value circuit 6-334, and a DTL FFE 6-218. The DTL FFE 6-218 includes a fractional delay value circuit 6-536 and a second FFE 6-538.

The first FFE 6-210 and DFE 6-214 are components of a first loop used to produce the received data DOUT. The first loop, ADC 6-204, and slicer 6-220 of the embodiment shown in FIG. 4 operates similarly to the corresponding components of the embodiment shown in FIG. 2, and therefore will not be described in detail.

The DTL FFE 6-218, TED 6-224, and clock circuit 6-208 are components of a second loop used to determine the phase and frequency of the sampling clock used by the ADC 6-204. The DTL FFE 6-218 of FIG. 6 differs from the DTL FFE 5-218 of FIG. 5 in that the second FFE 6-538 of FIG. 6 uses the same coefficients as the first FFE 6-210, as indicated by the dashed line.

In the DTL FFE 6-218, the FFE operation performed by the second FFE circuit 6-538 is convolved with a fractional delay using the fractional delay circuit 6-536. This allows very fine control of the sampling time. In an embodiment, the fractional delay circuit 6-536 generates the fractional delay by interpolating between successive output values from the ADC 6-204.

Figure 7:
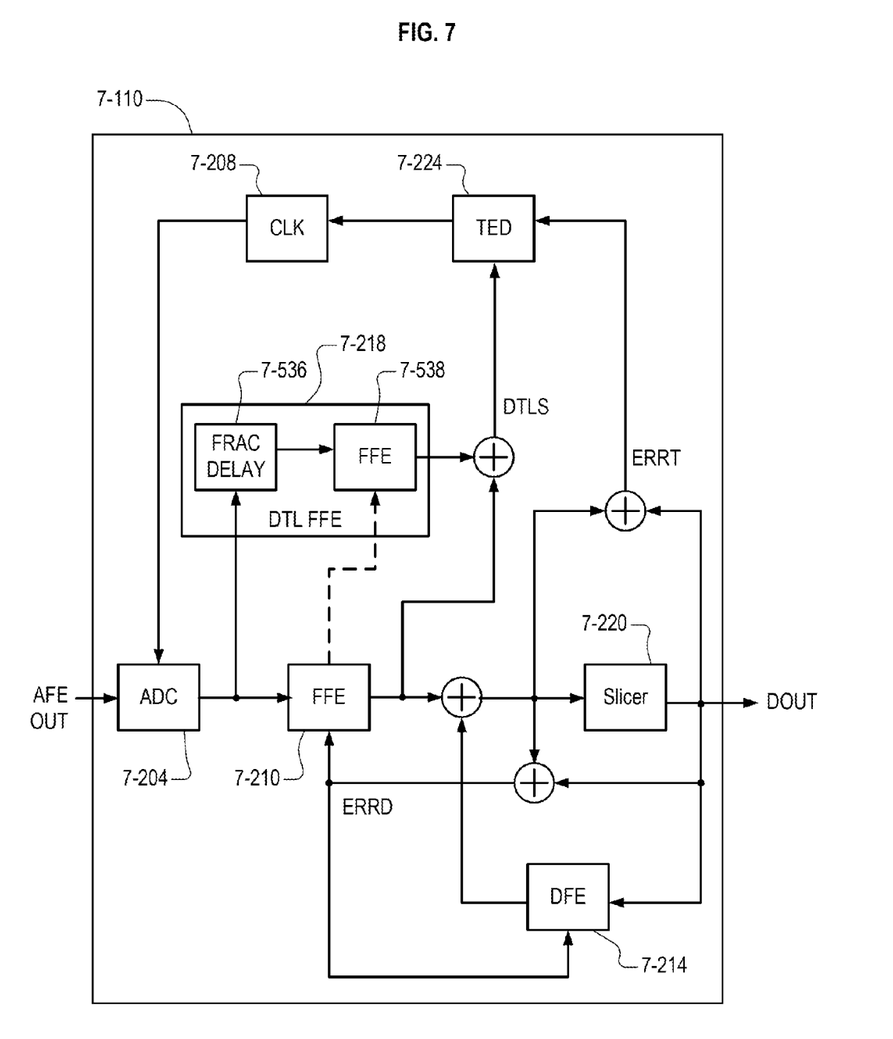
FIG. 7 is a block diagram of a CDR circuit according to another embodiment.

FIG. 7 is a block diagram of a CDR circuit 7-110 suitable for use as the CDR circuit 1-110 of FIG. 1 according to another embodiment. The CDR circuit 7-110 includes an ADC 7-204, a clock generator 7-208, a first FFE 7-210, a DFE 7-214, a slicer 7-220, a TED 7-224, and a DTL FFE 7-218. The DTL FFE 7-218 includes a fractional delay value circuit 7-536 and a second FFE 7-538.

The first FFE 7-210 and DFE 7-214 are components of a first loop used to produce the received data DOUT. The first loop, ADC 7-204, and slicer 7-220 of the embodiment shown in FIG. 4 operates similarly to the corresponding components of the embodiment shown in FIG. 2, and therefore will not be described in detail.

The DTL FFE 7-218, TED 7-224, and clock circuit 7-208 are components of a second loop used to determine the phase and frequency of the sampling clock used by the ADC 7-204. The second FFE 7-538 of FIG. 7 uses the same coefficients as the first FFE 7-210, as indicated by the dashed line.

In the DTL FFE 7-218, the FFE operation performed by the second FFE circuit 7-538 is convolved with a fractional delay using the fractional delay circuit 7-536. In an embodiment, the fractional delay circuit 7-536 generates the fractional delay by interpolating between successive output values from the ADC 7-204.

The output of the DTL FFE 7-218 is combined with the output of the first FFE 7-210 to produce a delay timing loop signal DTLS. In an embodiment, the delay timing loop signal DTLS is a finite difference over a fraction of a UI which approximates the derivative of the output of the first FFE 7-210, the fraction of the UI being determined by the fractional delay value circuit 7-536.

The received data DOUT is combined with the input signal to the slicer 7-220 to produce a timing error signal ERRT. In an embodiment, the TED 7-224 uses the delay timing loop signal DTLS and the timing error signal ERRT to perform a Minimum Mean Square Error (MMSE) calculation to determine the error power of the input signal to the slicer 7-220. The TED 7-224 then controls the clock circuit 7-208 by adjusting the phase and frequency of the sampling clock to optimize the ratio of the signal power to the error power, that is, to optimize the SNR.

In an embodiment of the CDR circuit 7-110, a plurality of filters can be implemented using the DTL FFE 7-218, each filter corresponding to a different channel profile. In an embodiment, the channel profiles include Long Reach Multimode (LRM) channel profiles for use in multimode fiber optic links. In an embodiment, a filter of the plurality of filters is a low pass filter convolved with a fractional delay, and the fractional delay is selected to optimize an SNR measurement.

Figure 8:
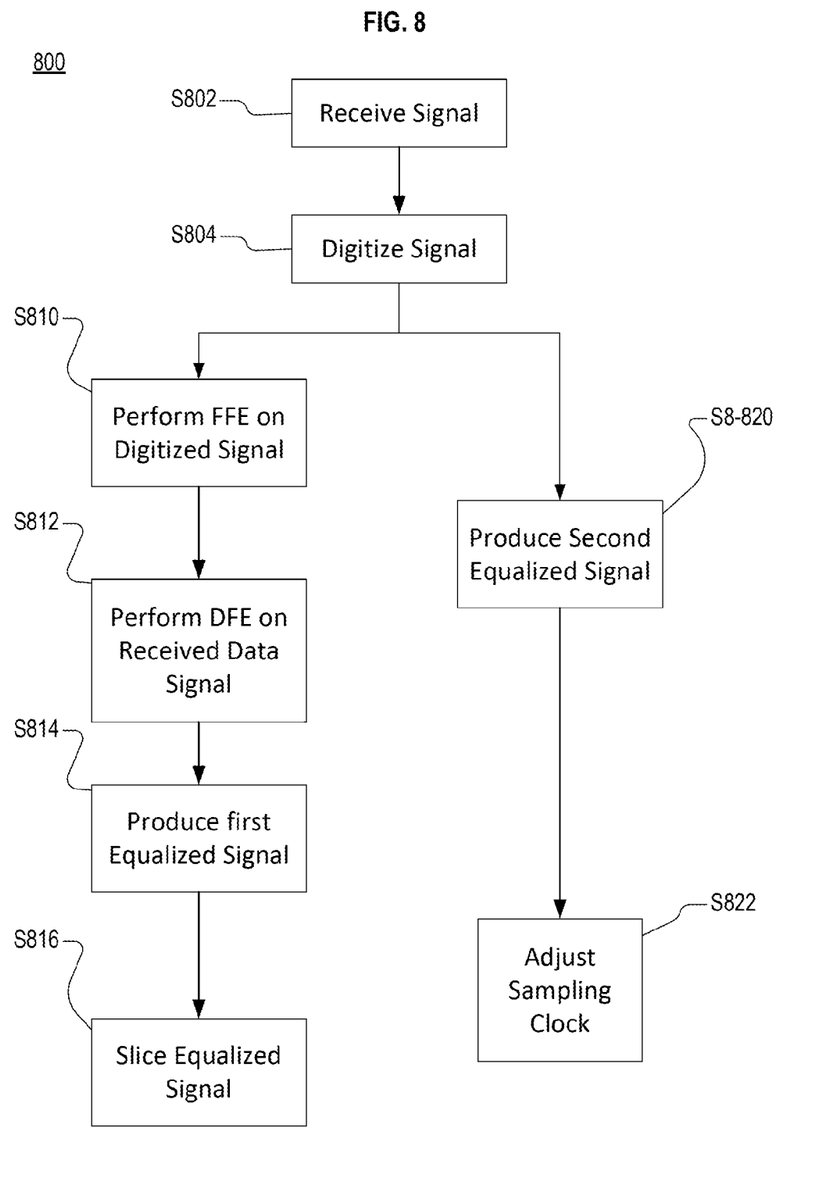
FIG. 8 is a flowchart of a process of performing clock and data recovery.

FIG. 8 is a flowchart of a process 800 of performing clock and data recovery.

At S802, a signal is received. The signal is an analog signal including a plurality of symbols. Each symbol may encode one or more bits of data.

At S804, the received signal is sampled and converted to a digitized signal by an Analog to Digital Converter (ADC). In an embodiment, the ADC performs one conversion per unit interval of the received signal. The timing of when the ADC samples and converts the received signal is determined by a sampling clock.

At S810, Feed Forward Equalization (FFE) is performed on the digitized signal. At S812, Decision Feedback Equalization (DFE) is performed using a received data signal, and specifically, using received data signals produced from previously-arrived symbols.

At S814, a first equalized signal is produced by combining the results of the FFE and the DFE. At S816, the first equalized signal is sliced to determine a received data signal.

At S8-820, a second equalized signal is produced using the digitized signal. In an embodiment, the second equalized signal is produced using a FFE other than the FFE of S810. In an embodiment, the second equalized signal is produced using a result of scaling the DFE of S812 by a scaling factor, the scaling factor being a positive value less than one. Features of other embodiments of S8-820 are illustrated in FIGS. 9 and 10.

At S822, a phase, a frequency, or both of the sampling clock is adjusted using the second equalized signal.

Figure 9:
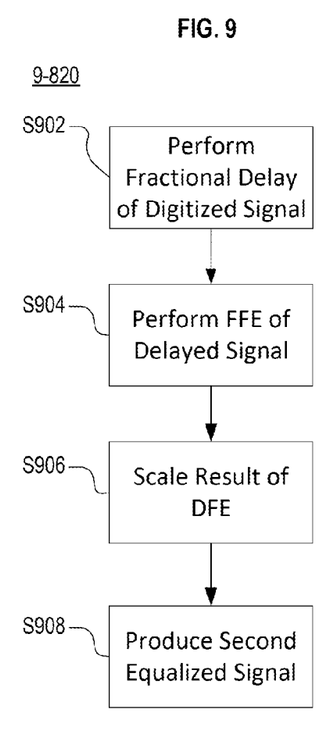
FIG. 9 is a flowchart of a process of producing an equalized signal suitable for use in the process of FIG. 8 according to an embodiment.
Figure 10:
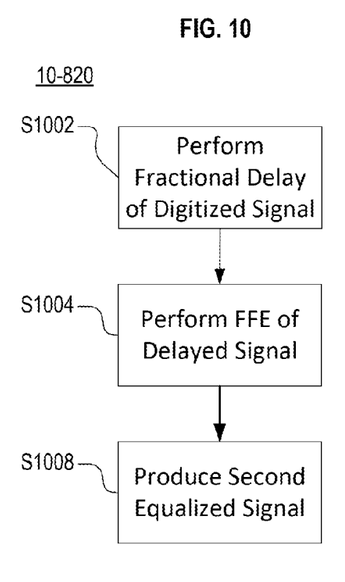
FIG. 10 is a flowchart of a process of producing an equalized signal suitable for use in the process of FIG. 8 according to another embodiment.

FIG. 9 illustrates a process 9-820 of generating the second equalized signal suitable for use in S8-820 of FIG. 8, according to an embodiment.

At S902, the digitized signal is delayed to produce a fractionally delayed signal. In an embodiment, the fractionally delayed signal is delayed by a duration between 0 and 1 UI. In an embodiment, interpolation is used to produce the fractionally delayed signal.

At S904, FFE is performed on the fractionally delayed signal. In an embodiment, the FFE performed on the fractionally delayed signal uses the same coefficients as the FFE of the digitized signal performed in S810 of FIG. 8. In another embodiment, the coefficients used in the FFE of S904 are independent of the coefficients used in the FFE of S810.

At S906, an output of the DFE of S812 of FIG. 8 is scaled by a scaling factor. The scaling value is between 0 and 1.

At S908, the second equalized signal is produced by combining the scaled results of the DFE with the results of the FFE of the fractionally delayed signal performed in S904.

FIG. 10 illustrates a process 10-820 of generating the second equalized signal suitable for use in S8-820 of FIG. 8 according to another embodiment.

At S1002, the digitized signal is delayed to produce a fractionally delayed signal. In an embodiment, the fractionally delayed signal is delayed by a duration between 0 and 1 UI. In an embodiment, interpolation is used to produce the fractionally delayed signal.

At S1004, FFE is performed on the fractionally delayed signal. In an embodiment, the FFE performed on the fractionally delayed signal uses the same coefficients as the FFE performed on the digitized signal in S810 of FIG. 8. In another embodiment, the coefficients used in the FFE of S1004 are independent of the coefficients used in the FFE of S810.

At S1008, the second equalized signal is produced using the result of the FFE of the fractionally delayed signal performed in S1004. In an embodiment, the second equalized signal is produced by combining the result of the FFE of S1004 with the result of the FFE of the digitized signal performed in S810 of FIG. 8.

Aspects of the present disclosure have been described in conjunction with the specific embodiments thereof that are proposed as examples. Numerous alternatives, modifications, and variations to the embodiments as set forth herein may be made without departing from the scope of the claims set forth below. Accordingly, embodiments as set forth herein are intended to be illustrative and not limiting.

What is claimed is:

1. An apparatus, comprising:
an analog to digital converter (ADC) configured to (i) sample an input signal according to a sampling clock, and (ii) provide a digitized signal based on having sampled the input signal according to the sampling clock;
a first loop circuit configured to provide a first equalized signal corresponding to the digitized signal;
a slicer configured to provide a data signal based on the first equalized signal; and
a second loop circuit configured to (i) provide a second equalized signal corresponding to the digitized signal, and (ii) adjust the sampling clock according to the second equalized signal,
wherein the first loop circuit includes a first Feed Forward Equalizer (FFE) configured to receive the first equalized signal, and
wherein the second loop circuit includes (i) a second FFE configured to provide the second equalized signal corresponding to the digitized signal, (ii) a leak circuit configured to scale a signal by a leak coefficient, or (iii) both the second FFE and the leak circuit.

2. The apparatus of claim 1, wherein the input signal includes a plurality of symbols transmitted at a baud rate, and the ADC is configured to sample the input signal at a rate substantially equal to the baud rate to produce the digitized signal.

3. The apparatus of claim 1, wherein the first loop circuit includes:
a Decision Feedback Equalizer (DFE) configured to receive the data signal, and wherein the first loop circuit is configured to produce the first equalized signal using output signals of the first FFE and the DFE.

4. The apparatus of claim 3, wherein the leak circuit is configured to receive an output of the DFE of the first loop circuit and scale the output of the DFE by the leak coefficient, the leak coefficient being less than one, and
wherein the second loop circuit is configured to generate the second equalized signal using output signals of the leak circuit and the first FFE of the first loop circuit.

5. The apparatus of claim 1, wherein the second FFE is configured to receive the digitized signal, and wherein the second loop circuit includes:
a Timing Error Detector configured to control a phase of the sampling clock according to an output signal of the second FFE.

6. The apparatus of claim 1, wherein the second FFE is configured to receive the digitized signal,
wherein the first loop circuit includes a Decision Feedback Equalizer (DFE) configured to receive the data signal,
wherein the leak circuit is configured to receive an output of the DFE of the first loop circuit and scale the output of the DFE by the leak coefficient, the leak coefficient being less than one, and wherein the second loop circuit is configured to generate the second equalized signal using output signals of the leak circuit and the second FFE.

7. The apparatus of claim 1, wherein the second loop circuit includes:
a fractional delay circuit configured to receive the digitized signal, and
wherein the second FFE is configured to receive an output signal of the fractional delay circuit.

8. The apparatus of claim 7, wherein the second loop circuit is configured to generate the second equalized signal using output signals of the first FFE and second FFE.

9. The apparatus of claim 8, wherein the second loop circuit is configured to perform a Minimum Mean Square Error (MMSE) calculation using an approximation of a derivative of the digitized signal to determine an error power of the equalized signal.

10. The apparatus of claim 1, wherein the second FFE uses the same coefficients as the first FFE.

11. The apparatus of claim 1, wherein the apparatus is in an integrated circuit.

12. A method of performing clock and data recovery in a receiver, the method comprising:
converting an analog signal into a digitized signal using a sampling clock;
providing a first equalized signal using the digitized signal;
providing a second equalized signal using the digitized signal;
determining the sampling clock using the second equalized signal; and
generating a data signal using the first equalized signal,
wherein the first equalized signal is provided by a first loop circuit, the first loop circuit including a first Feed Forward Equalizer (FFE) configured to receive the digitized signal, and
wherein the second equalized signal is provided by a second loop circuit, the second loop circuit including (i) a second FFE configured to provide the second equalized signal according to the digitized signal, (ii) a leak circuit configured to scale a signal by a leak coefficient, or (iii) both the FFE and the leak circuit.

13. The method of claim 12, wherein providing the first equalized signal includes:
performing a first convolution of the digitized signal using the first feed forward equalizer;
performing a second convolution of the data signal using a decision feedback equalizer; and
combining results of the first and second convolutions to produce the first equalized signal.

14. The method of claim 13, further including:
determining an error value using the first equalized signal and the data signal; and
adapting coefficients of the first and second convolutions using the error value.

15. The method of claim 13, wherein the second loop circuit is different than the first loop circuit, and providing the second equalized signal includes:
performing, in the second loop circuit, a third convolution of the digitized signal using the second feed forward equalizer;
scaling, using the leak circuit, a result of the second convolution by the leak coefficient;
combining the scaled result with a result of the third convolution to produce the second equalized signal;
determining an error value using the second equalized signal and the data signal; and
adapting coefficients of the third convolution using the error value.

16. The method of claim 13, wherein providing the second equalized signal includes:
scaling, using the leak circuit, a result of the second convolution by the leak coefficient; and
combining the scaled result with a result of the first convolution to produce the second equalized signal.

17. The method of claim 12, wherein providing the second equalized signal includes:
performing a convolution on the digitized signal to produce an equalized signal using the second feed forward equalizer to produce the second equalized signal;
determining an error value using the second equalized signal and the data signal; and
adapting coefficients of the convolution using the error value.

18. The method of claim 12, wherein providing the second equalized signal includes:
computing, in the second loop circuit, a fractionally delayed signal using the digitized signal; and
performing, in the second loop circuit, a convolution on the fractionally delayed signal using the second feed forward equalizer.

19. The method of claim 18, wherein the convolution is a first convolution, and wherein producing the second equalized signal further includes:
performing, in the first loop circuit, a second convolution on the data signal using a decision feedback equalizer;
scaling, using the leak circuit, a result of the second convolution by the leak coefficient, the leak coefficient being less than one; and
combining a result of the scaling with a result of the first convolution to produce the second equalized signal.

* * * * *